United States Patent Office 2,851,394
Patented Sept. 9, 1958

2,851,394

COMPOSITIONS CONTAINING FERROUS SULFATE AND DIOCTYL SODIUM SULFOSUCCINATE

Joseph B. Vaughan, Norwood, Ohio, assignor to Lloyd Brothers, Inc., Cincinnati, Ohio, a corporation of Ohio No Drawing. Application May 14, 1956
Serial No. 584,476

6 Claims. (Cl. 167—68)

The present invention relates to a means for promoting absorption of certain drugs and compositions therefor. More specifically, the invention relates to compositions consisting essentially of dioctyl sodium sulfo-succinate with soluble drugs producing systemic action on oral administration or upon application to membranes of the human body and particularly with drugs that are ordinarily poorly absorbed or in which there is a lack of uniformity of absorption from time to time in the same patient or in different patients.

In the human body, fat absorption depends in part upon a hydrolytic cleavage (digestion) effected in the intestine by body enzymes which are soluble only in water or in the aqueous intestinal fluids. Since fats and oils do not mix easily and thoroughly with these aqueous fluids, there is a physical difficulty involved in the digestion of these substances. Any agent which would homogenize fats and oils or assist their intermixture with the aqueous intestinal fluids could be expected to bring the enzymes into more intimate contact with the fat molecules and thus promote or facilitate digestion. This in turn could result in better absorption of these substances because it is only the products of the digestive process which are absorbed.

Since dioctyl sodium sulfosuccinate possesses the property of decreasing the surface tension at an oil-water interface, Wilson and Dickinson hoped and undertook to determine that this substance would act to improve digestion of fats and possibly the absorption of protein foods. See J. A. M. A., vol. 158, pp. 261–263, 1955. The findings, however, were reported by Wilson and Dickinson to be "quite equivocal" in that while a few patients showed better absorption of these food elements, the majority showed no effect or even a lesser effect on absorption from the concomitant use of dioctyl sodium sulfosuccinate. This report shows that Wilson and Dickinson's hopes were not realized. The teaching of Wilson and Dickinson, therefore, is that dioctyl sodium sulfosuccinate has no significant effect on the promotion of fat digestion nor upon the absorption of these food principals from the intestine.

The present invention has no relationship to the prior digestion of fats, which process must occur before the hydrolytic cleavage product can be absorbed. Nor is it in any way related to the absorption of such food principals as fats or proteins. Instead, it deals with the improved absorption of dissolved chemical molecules by absorbing membranes of the human body. The net result is more consistent, more rapid and more uniform absorption.

During investigations in our laboratory, evidence was found that dioctyl sodium sulfosuccinate markedly increases the absorption of certain medicaments. For example, it was found that a mydriatic drug, scopolamine methyl bromide, when administered with dioctyl sodium sulfosuccinate topically to the eye of a rabbit caused rapid and prolonged mydriasis (paralysis of the iris muscle). A solution of scopolamine methyl bromide of the same identical concentration but without the addition of dioctyl sodium sulfosuccinate when applied in this same amount, in the same way at the same time in the other eye of the same animal produced mydriasis much more slowly. Finally, it was confirmed that dioctyl sodium sulfosuccinate, when similarly applied, alone, causes no mydriasis.

The same principle of more rapid and more complete absorption of scopolamine methyl bromide, but in the human intestinal tract, has been confirmed clinically. The following is illustrative. Scopolamine methyl bromide, administered in approved average dosage, for use as an antispasmodic drug, was found, due to increased absorption, to produce extreme antispasmodic effects with extraordinary pronounced side effects, viz., extreme dryness of the mouth and nose and blurring of vision when given simultaneously with dioctyl sodium sulfosuccinate. These are the known actions of scopolamine methyl bromide when given in overdosage. They are not produced to anything like the same extent or degree of severity from the use of identical doses of scopolamine methyl bromide when dioctyl sodium sulfosuccinate is not administered simultaneously.

It was further found in our laboratory that the oral administration of 1,8 dihydroxyanthraquinone (Danthron) did not produce death in rats even in quantities of as much as 22 mg./kg. On the other hand, when this substance was administered in combination with non-toxic amounts of dioctyl sodium sulfosuccinate only 9 gm./kg. was sufficient to give a 50 percent kill in rats. This effect can only be due to increased absorption since the animals die with symptoms of systemic toxicity. The greater absorption of this agent (Danthron) is indicated also by a recent clinical observation. See Antos, Southwestern Medicine, vol, 37, pp. 236–237, April 1956.

The reason that dioctyl sodium sulfosuccinate markedly promotes the absorption of certain medicaments, on the one hand, and not the food principles studied by Wilson and Dickinson could be due to different solubilities, different molecular configuration of the molecules as well as different body absorbing mechanisms for different types of molecular species. For example, fats are known to be absorbed in the human intestine in such a way that the end products of absorption are carried by vessels called lacteals, into the thoracic duct and thence directly to the blood stream. Most other agents, including drugs, on the other hand are absorbed through capillaries in the intestinal villi and this blood is carried through the portal circulation through the liver prior to its entry into the general body circulation. Many metabolic changes take place during the sojourn of these substances in the liver. In a sense, it is not surprising that dioctyl sodium sulfosuccinate acts differently in each case, but it is surprising that it acts as it does. However, regardless of possible theoretical explanations, and the lack of activity to promote absorption of fats into the lacteals, dioctyl sodium sulfosuccinate has been found to actively promote the absorption of drugs absorbed through the capillaries.

The present invention thus provides a means for promoting the absorption of soluble medicaments. With better absorption, it is possible to employ smaller amounts of drugs of the nature of those which are absorbed with difficulty, the physiologic effects are more prompt, more uniform and more certainly predictable. This latter effect makes it possible to avoid undesirable side effects in many patients who, because of inconsistent absorption in most patients, are given an overly-active dosage on the basis of the "average" response.

The dioctyl sodium sulfosuccinate can be advantageously administered with a great many medicaments other than those which are insoluble or totally unabsorbable. The following examples are illustrative.

Example I

About 100.8 g. of exsiccated ferrous sulfate are first mixed with 30.8 g. of sucrose, 1.8 g. of acacia and 4.8 g. of talc and the resulting mixture thoroughly mixed with 5.04 g. of dioctyl sodium sulfosuccinate dissolved in 20 cc. of isopropanol. The isopropanol is then allowed to evaporate and the resulting mixture granulated, mixed with starch paste and talc and compressed into 504 tablets in accordance with standard procedures in the tableting art. The resulting tablets which contain 10 mg. of dioctyl sodium sulfosuccinate and 200 mg. of ferrous sulfate can be sugar coated, enteric coated, etc., if desired, by customary procedures in this art. Also, in place of tablets, the mixture can be encapsulated in hard gelatin capsules. Various other pharmaceutical inert carriers or diluents can also be employed in the preparation of the tablets and capsules. Other medicaments compatible with the iron can be incorporated as desired. See Example III described below.

Example II

To about 75 gallons of distilled water add and dissolve with gentle mixing 4 lbs. 3 oz. of dioctyl sodium sulfosuccinate, 2 lbs. 8 oz. 33 gr. of citric acid, 41 lbs. 12 oz. of ferrous sulfate and bring to 100 gallons with distilled water. Small amounts of a preservative such as methyl paraben (6 oz. 175 gr.) and a solubilizer such as sorbitan monooleate (½ gallon Tween 80) are also ordinarily added along with approved color and flavor to suit. One teaspoonful of this solution contains 20 mg. of dioctyl sodium sulfosuccinate and is usually taken in this form three times a day to provide the desired amount of available iron.

Example III

This example corresponds to Example I but calls, in addition, for the addition of 7.56 g. of cobaltous chloride along with the ferrous sulfate.

Example IV

This example corresponds to Example II but calls, in addition, for the addition of 2 lbs. 8 oz. 30 gr. of cobaltous chloride along with the ferrous sulfate.

Various other therapeutically useful iron and iron-cobalt compositions can be employed with the dioctyl sodium sulfosuccinate. Equivalent forms of iron and cobalt e. g. ferrous gluconate, cobaltous sulfate, etc., for example, can be employed. The fused Fe:Co amino acid complex described in the copending Vaughan et al. application Serial No. 550,858, filed December 5, 1955, can also be employed to advantage with dioctyl sodium sulfosuccinate.

In the therapeutically available iron preparations, tablets or capsules can contain about 100–300 mg. of ferrous sulfate although ordinarily about 150-250 mg. per dosage unit is employed with about 200 mg. of ferrous sulfate or the equivalent of available iron being preferred. Where cobalt is included the tablets or capsules normally contain about 10–20 mg. of cobaltous chloride with about 15 mg. of cobaltous chloride or the equivalent being preferred. With liquid preparations similar dosage units are normally employed per teaspoon of liquid. The amounts and ratios can vary although a dosage unit containing about 15-60 mg. of iron with or without about 1-3 mg. of cobalt are in the generally preferred range. Various solid and liquid pharmaceutical carriers can be employed.

The amounts of dioctyl sodium sulfosuccinate employed with these heavy metal preparations and the preparations containing other medicaments such as described below, can vary from about 5–150 mg. per dosage unit. Ordinarily, about 10–30 mg. per dosage unit is preferred. With the iron preparations illustrated above, about 10 mg. of dioctyl sodium sulfosuccinate per dosage unit (particularly where the dose is repeated to provide three doses daily) has been found to give highly satisfactory results. The larger amounts of dioctyl sodium sulfosuccinate can be employed to advantage where constipation is involved or where the medicament has a constipating tendency as is the case with certain patients taking iron preparations in the treatment of iron deficiency anemias.

In addition to the above iron-containing compositions useful for treatment of anemias, the dioctyl sodium sulfosuccinate can also be employed with antispasmodic drugs such as scopolamine methyl bromide or laxatives such as Danthron or phenolphthalein as described in my copending application Serial No. 537,873, filed September 30, 1955, of which the present application is a continuation-in-part.

The soluble, including difficulty-soluble, medicaments with which dioctyl sodium sulfosuccinate can be employed to promote absorption include heavy metals, such as iron, referred to above; alkaloids and derivatives thereof, such as scopolamine methyl bromide, also referred to above; glycosides such as cardiac glycosides, e. g. digitoxin; barbituates, e. g. phenobarbital, insulin, steroids, e. g. estrone; sulfonamides, e. g. sulfadiazine; antibiotics, such as the soluble salts of penicillin, etc. The medicaments as noted above should be soluble or partially so in aqueous liquids and when taken orally soluble in the digestive tract or be in such form that they are rendered soluble therein.

I claim:

1. A composition consisting essentially of therapeutically available iron as ferrous sulfate in combination with dioctyl sodium sulfosuccinate.

2. A composition in dosage unit form comprising essentially about 100–300 mg. of ferrous sulfate, about 5–150 mg. of dioctyl sodium sulfosuccinate and a pharmaceutical carrier.

3. A composition in dosage unit form comprising essentially about 150–250 mg. of ferrous sulfate, about 10–30 mg. of dioctyl sodium sulfosuccinate and a solid pharmaceutical carrier.

4. A composition in dosage unit form consisting essentially of about 200 mg. of ferrous sulfate, about 10 mg. of dioctyl sodium sulfosuccinate and a pharmaceutical carrier.

5. A composition comprising essentially about 150–250 mg. of ferrous sulfate, about 10–20 mg. of cobaltous chloride, about 10–30 mg. of dioctyl sodium sulfosuccinate and a pharmaceutical carrier.

6. A composition in dosage unit form consisting essentially of about 200 mg. of ferrous sulfate, about 15 mg. of cobaltous chloride, about 10 mg. of dioctyl sodium sulfosuccinate and a pharmaceutical carrier.

References Cited in the file of this patent

Pozo: Chem. Absts., vol. 48, 1954, p. 5443(e).

Driver: Am. J. Physiology, vol. 135, 1942, pp. 330–336.

U. S. Disp., 24th ed., 1947, Lippincott Co., Phila., Pa., pp. 478, 479, 1403, and 1404.